Patented Aug. 10, 1943

2,326,278

UNITED STATES PATENT OFFICE 2,326,278

MAKING OF BREAD

John C. Baker, Montclair, N. J., assignor to Standard Brands Incorporated, New York, N. Y., a corporation of Delaware No Drawing. Continuation of application Serial No. 264,567, March 24, 1928. This application December 1, 1942, Serial No. 467,538

25 Claims. (Cl. 99—90)

This invention relates to the art of making yeast leavened bread.

I have discovered that the addition of a small quantity of carbamide $(NH_2)_2CO$, together with a small amount of an enzyme which tends to cause hydrolysis of the carbamide, to an ordinary bread dough containing yeast and flour, and more especially to the American type of bread dough in which a sugar is used, accelerates the fermentation of the dough and improves the flavor, taste, odor, crust color and keeping qualities of the bread made from the dough. The appropriate enzyme, urease, may easily be obtained by using ground soy bean, in which it naturally occurs.

A specific process embodying my invention is as follows: To a dough of wheat flour and water containing the usual quantity of yeast, and also a sugar and the other ingredients customarily used in making American bread, I add 2 ounces of carbamide and 1 ounce of ground soy bean meal (containing the enzyme urease) per barrel of flour. The dough thus produced is a new composition of matter which is a part of my invention.

After the customary mechanical kneading, the dough is allowed to ferment and is then baked in the ordinary manner.

The amounts of carbamide and ground soy bean meal to be added are subject to considerable variation. A reduction in the amount of carbamide below 2 ounces per barrel of flour produces the improved qualities before mentioned, but in a less degree than when 2 ounces are used. The carbamide may be increased above 2 ounces per barrel of flour, but such increase, while not objectionable, is unnecessary when urease is used. Any small quantity of ground soy bean meal has a beneficial effect, and, if desired, the amount may be increased above 1 ounce per barrel of flour. The amount of ground soy bean meal, which material is highly colored and has a noticeable flavor of its own, should, however, not be sufficient to affect the color or taste of the bread. More than 3 ounces of ground soy bean meal per barrel of flour in conjunction with approximately 2 ounces of carbamide is objectionable because it may cause too rapid hydrolysis of the carbamide, with resulting too rapid generation of ammonia causing discoloration of the bread and affecting the taste.

In place of the ground soy bean meal, other sources of the enzyme urease may be used, such as meal formed from other beans or seeds containing this enzyme or a concentrated extract from soy bean or such other beans or seeds containing the enzyme.

Soy bean also naturally contains a component which is hereinafter referred to as "an active carotin removing enzyme." A feature of my invention is the provision of a composition, more fully described herein, for baking purposes, which comprises a wheat flour, or other inert filler, mixed with a small quantity of ground vegetable matter, such as soy bean, containing an active carotin removing enzyme.

The more active fermentation produced in the new process results in economizing sugar. The process may also be used to economize yeast, as the normal rate of fermentation of the dough may be obtained with less than the normal amount of yeast when the carbamide and urease are used.

While, in carrying out the process which has been described, the carbamide and urease may be separately added to the dough, an important feature of my invention consists in providing a new composition of matter which is stable, and which contains both of these substances. This new composition may be termed a bread improver, since the addition of it to an ordinary dough produces an improved quality of bread as above described. The new bread improver consists of finely divided carbamide in dry crystalline form, the enzyme urease, and a finely divided inert filler which serves to sepaarte the urease from the carbamide and thus to prevent hydrolysis of the carbamide, making the improver stable. The composition of the improver which I now consider best is as follows:

| | Parts |
|---|---|
| Carbamide | 2 |
| Ground soy bean meal | 1 |
| Dried wheat flour | 3 |

In this composition, the wheat flour and the major part of the soy bean flour serve as a filler, preventing direct contact of any considerable amount of the enzyme urease with the grains of carbamide. It will be apparent that the process heretofore described may be carried out by adding to an ordinary dough 6 ounces of this improver per barrel of flour. The proportion of the ingredients of the improver may be varied somewhat, other inert filler may be substituted for wheat flour, and other substitutes containing the enzyme urease may be substituted for the soy bean meal. The amount or filler may be increased, or may be reduced if all the ingredients of the bread improver are thoroughly dried before they are mixed.

While the new process may conveniently be carried out by means of the improver which has been described, a feature of the invention consists in providing a new flour compound facilitating the carrying out of the process. The new compound is made by mixing with wheat flour small quantities of finely divided carbamide and ground soy bean meal or other finely ground source of urease. The composition of this compound which I have found best is:

| | | |
|---|---|---|
| Carbamide | ounces | 2 |
| Soy bean flour | do | 1 |
| Wheat flour | pounds | 196 |

Even small amounts of carbamide and soy bean flour may be used to advantage. I have ascertained that the benefits of the invention are obtained to a useful extent even when the quantities of these ingredients are reduced to one quarter of the amounts above given. The carbamide and soy bean flour should be thoroughly distributed through the wheat flour. This may easily be accomplished by means of any of the devices commonly used in flour mills for blending flours of different grades. Alternatively, it may be effected by adding to wheat, before it is ground into flour, the soy bean meal, and if desired, also, the carbamide. In this case, the grinding effects the requisite distribution of the carbamide and soy bean meal.

The new flour compound is used by mixing it with water, yeast and the other usual ingredients used in making an ordinary wheat flour dough. Thus, with no additional trouble, the baker secures the improved dough which has been described, and carries out the new process.

A further advantage of the new flour compound is that it is more stable than ordinary flour, that is to say, it has less tendency to become rancid with age.

I have discovered also that the quality of bread may be improved substantially by adding to an ordinary bread dough a small quantity of soy bean meal or other source of the enzyme urease, even though the substrate of this enzyme, carbamide, is not used with the enzyme. A feature of my invention, therefore, consists in improving the quality of bread by adding to an ordinary bread dough, a small quantity, for example up to 3 ounces soy bean meal per barrel of flour, or the equivalent amount of other urease-bearing substance.

This application is a continuation of my copending application Serial No. 264,567, filed March 24, 1928.

Having described my invention, what I claim as new and desire to secure by Letters Patent is:

1. The process of making leavened bread, which comprises bringing into admixture with a dough containing flour, yeast and water, relatively small proportions of carbamide and the enzyme urease, and fermenting the dough.

2. A bread improver, comprising finely divided carbamide, a substance containing the enzyme urease, and a sufficient quantity of a finely divided inert filler to separate substantially all of the urease from the carbamide.

3. A bread improver, comprising finely divided carbamide, soy bean flour containing urease, and a sufficient quantity of a finely divided inert filler to separate substantially all of the urease contained in the soy bean flour from the carbamide.

4. A bread improver, comprising a mixture of dried carbamide and dried soy bean meal containing urease, the major part of the soy bean meal serving as a filler to separate the urease contained therein from the carbamide.

5. A flour composition, comprising a substantially dry mixture of flour and a relatively small proportion of carbamide and urease-bearing substance.

6. A flour composition, comprising a mixture of wheat flour with relatively small proportions of soy bean flour containing urease, and carbamide.

7. A flour composition, comprising a mixture of wheat flour, soy bean flour containing urease, and carbamide, in which the amount of the latter two ingredients is approximately one one-thousandth of the amount of wheat flour.

8. A flour composition comprising a substantially dry mixture of wheat flour with a relatively small proportion of dry soy bean meal containing urease, the proportion being insufficient to affect the color of bread made from the flour.

9. A composition of matter for making dough, comprising a dry mixture of wheat flour and soy bean flour containing urease, the amount of soy bean flour being less than 3 ounces per barrel of wheat flour.

10. The process of making leavened bread, which comprises bringing into admixture wheat flour, yeast, relatively small proportions of carbamide and of the enzyme urease, and water to form a dough, and fermenting the dough.

11. The process of making leavened bread, which comprises bringing into admixture water, wheat flour, yeast, soy bean flour containing urease and carbamide, the amount of the latter two ingredients being approximately one one-thousandth of the amount of wheat flour, to form a dough, and fermenting the dough.

12. A process for producing leavened bread, which comprises supplying to a dough batch containing yeast, a supply of readily available carbohydrate material, carbamide, and urease in a sufficient amount to liberate ammonia from the carbamide to furnish readily available nitrogen food to the yeast to enhance the fermentation.

13. A process for producing leavened bread, which comprises supplying to a dough batch containing yeast, a readily available carbohydrate material, carbamide, and soy bean flour containing urease.

14. A bread improver comprising carbamide and urease in a substantially dry form.

15. A bread improver including carbamide and soy bean flour containing urease.

16. A product for baking purposes which comprises a wheat flour mixed with a small quantity of ground vegetable matter containing an active carotin-removing enzyme.

17. A process of preparing a bread dough, which comprises adding to dough a small percentage of vegetable flour containing urease, said percentage being sufficient to improve the qualities but insufficient to affect the color and taste of bread made from the dough.

18. A process of preparing a bread dough, which comprises adding to dough a small percentage of soy bean flour containing urease, said percentage being sufficient to improve the qualities but insufficient to affect the color and taste of bread made from the dough.

19. A process of preparing a bread dough, which comprises adding to dough a small percentage of an urease containing extract from a vegetable material.

20. A product for baking purposes, which comprises a flour mixed with a small percentage of ground vegetable matter containing urease, said percentage being sufficient to improve the qualities but insufficient to affect the color and taste of bread made therefrom.

21. A product for baking purposes, which comprises a wheat flour mixed with a small quantity of ground soy bean containing an active carotin-removing enzyme.

22. A bread making composition for use in conjunction with flour, water and yeast in an amount between one ounce of ground vegetable matter per barrel of flour and an amount below that at which said ground vegetable matter affects the color or taste of the bread, comprising an inert filler in admixture with ground vegetable matter containing an active carotin removing enzyme.

23. A bread making composition for use in conjunction with flour, water and yeast in an amount between one ounce of ground soy bean per barrel of flour and an amount below that at which said ground soy bean affects the color or taste of the bread, comprising an inert filler in admixture with ground soy bean containing an active carotin removing enzyme.

24. A bread making composition for use in conjunction with flour, water and yeast, comprising a starchy filler in admixture with ground soy bean containing an active carotin removing enzyme.

25. A bread making composition for use in conjunction with flour, water and yeast, comprising a starchy filler in admixture with ground vegetable matter containing urease.

JOHN C. BAKER.